March 10, 1936.  G. A. KLIMEK  2,033,474
TORQUE CONVERTER
Filed July 23, 1934   5 Sheets-Sheet 1

INVENTOR
Gustav A. Klimek
BY
ATTORNEYS

March 10, 1936. G. A. KLIMEK 2,033,474
TORQUE CONVERTER
Filed July 25, 1934 5 Sheets-Sheet 2
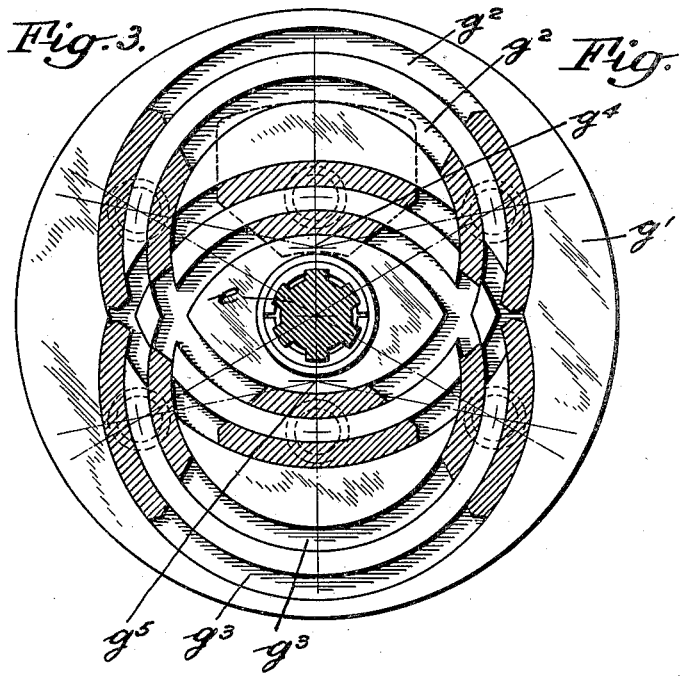
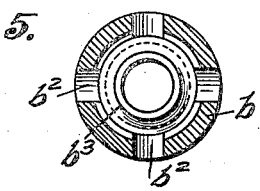
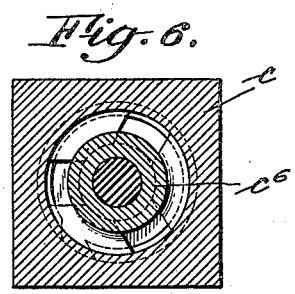
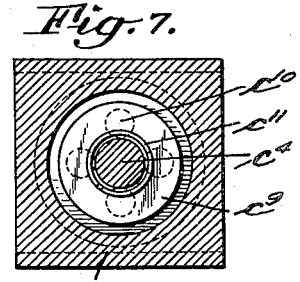
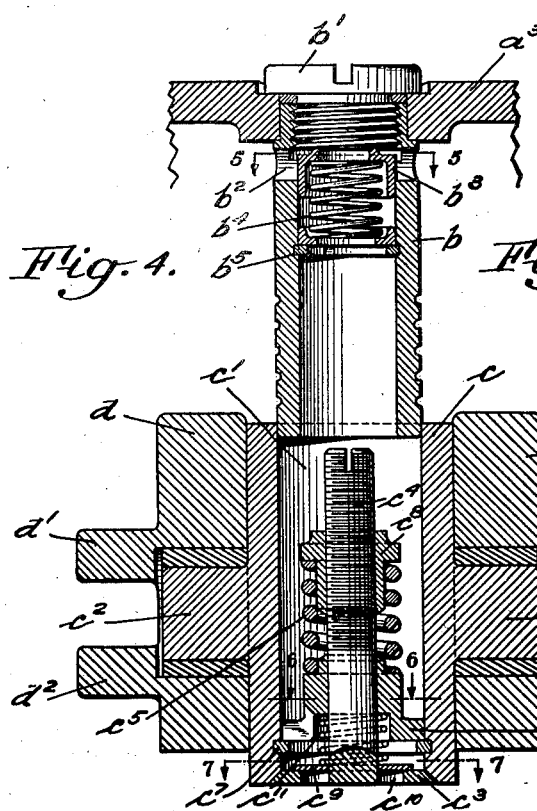
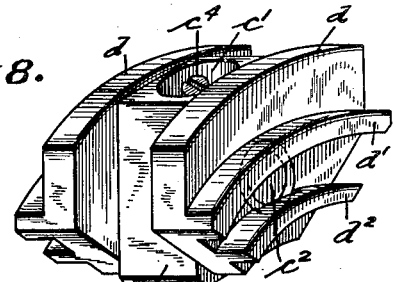
INVENTOR,
Gustav A. Klimek
BY
Redding, Greely, O'Shea & Campbell
ATTORNEYS March 10, 1936.  G. A. KLIMEK  2,033,474
TORQUE CONVERTER
Filed July 25, 1934  5 Sheets-Sheet 3

INVENTOR,
Gustav A. Klimek
BY
Redding, Greeley, O'Shea & Campbell
ATTORNEYS

March 10, 1936.  G. A. KLIMEK  2,033,474
TORQUE CONVERTER
Filed July 25, 1934  5 Sheets-Sheet 4
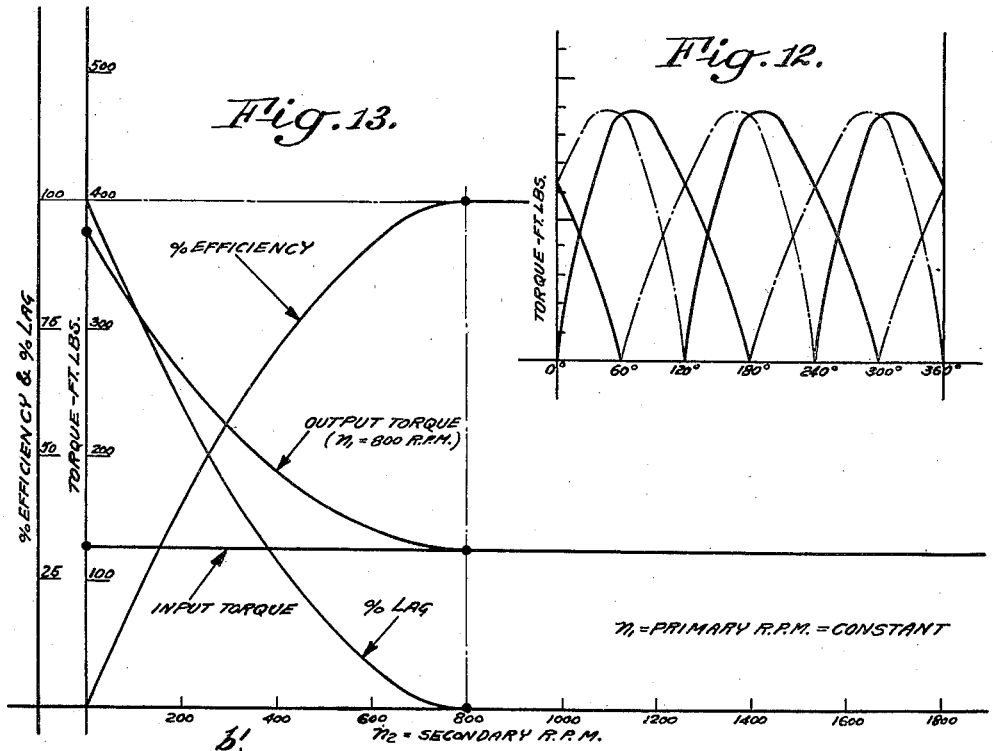
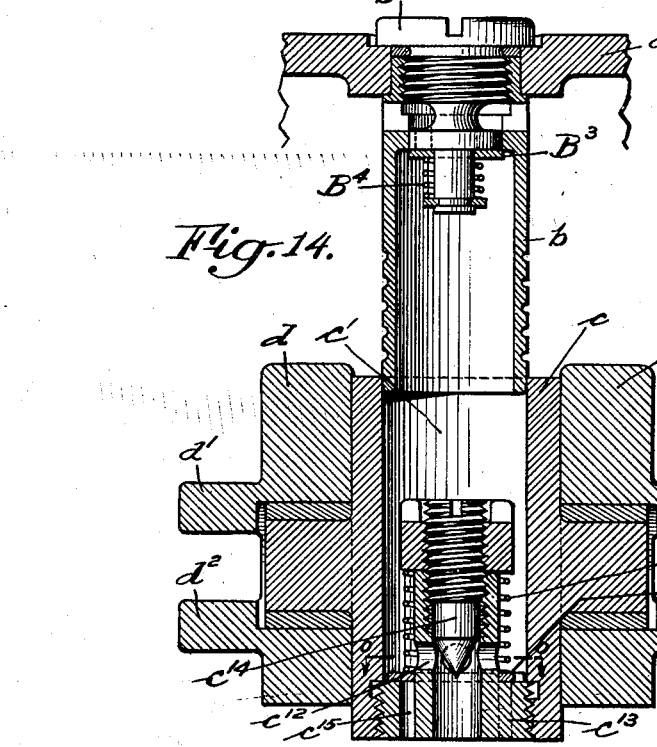
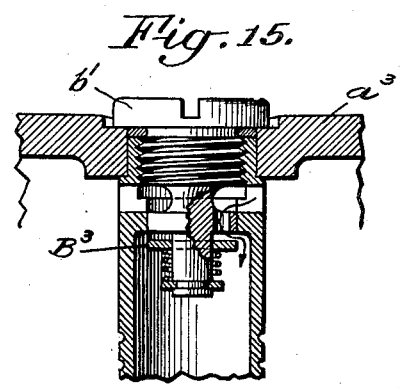
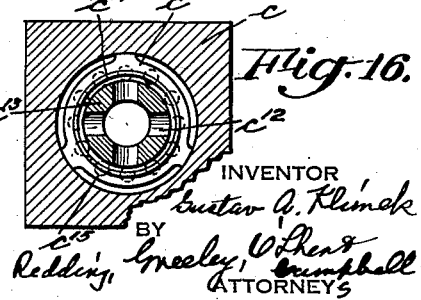

Patented Mar. 10, 1936

2,033,474

UNITED STATES PATENT OFFICE 2,033,474

TORQUE CONVERTER

Gustav A. Klimek, East Rutherford, N. J., assignor to Diehl Corporation, New York, N. Y., a corporation of New York Application July 25, 1934, Serial No. 736,876

9 Claims. (Cl. 74—64)

This invention relates generally to a device for transmitting torque from a driving element to a driven element and in which the conversion may vary from any predetermined ratio to zero. The construction physically has many characteristics of fundamental importance, among which may be enumerated simplicity, efficiency, automatic performance, flexibility, and accessability of parts. More specifically, the principal object of the present invention is to provide an efficient torque converter whose operation is automatically related to the speed of the prime mover, and an idling range is afforded while insuring automatically the propulsion of the driven element at a predetermined speed of the prime mover with maximum torque ratio. A further object of the invention is to provide a device of the character indicated in which the efficiency in transmission increases directly with the reduction of the torque ratio, so that when the torque ratio becomes 1 to 1 the driving and driven members rotate in unison with 100% efficiency in torque transmission. A further object of the invention is to provide such a converter with the inherent capacity of affording a yielding connection at all times between the driving and driven members thereby protecting the parts against shocks and excessive stresses. Still another object of the invention, as has been implied hereinbefore, is to provide for the transmission of torque from a driving to a driven element through the control of the driving element and without the need for the interposition of a clutch per se. Conversely, the invention embodies in the improved device capacity for the overrunning by the driven member of the driving member without the interposition of a free wheeling unit or the like. In connection with this object of the invention, however, the device is capable of modification readily so that the free wheeling characteristic is eliminated and provision made for resisting the free overrunning of the driving element, thereby impressing on the driven element the braking action of the driving element.

In accordance with the preferred embodiment of the invention it is contemplated that oil shall be employed in the improved converter as the medium for transmitting certain necessary reactances and in such embodiment the improved device has the further advantage of housing the moving parts in oil assuring silent operation.

A further object of the invention is to provide a torque converter which shall be maintained in dynamic and static balance and shall be free of the need of manual control of any of its parts.

These and other objects and advantages will be apparent to one skilled in the art in connection with the detailed description given of the embodiment illustrated by way of example in the accompanying drawings, in which—

Figure 3 is a view in transverse section through the interior of the housing shown in Figure 1 and taken on the plane indicated by the line 3—3 of Figure 1 looking in the direction of the arrows.

Figure 4 is a fragmentary view in section and on a larger scale through one of the movable impellers and showing its relation to a cooperating fixed "piston" carried on the primary rotor.

Figures 5, 6 and 7 are transverse sectional views showing details of certain valve constructions and taken respectively on the lines 5—5, 6—6 and 7—7, of Figure 4 and looking in the direction of the arrows.

Figure 8 is a view in perspective of an assembly of one of the movable impellers.

Figure 1:
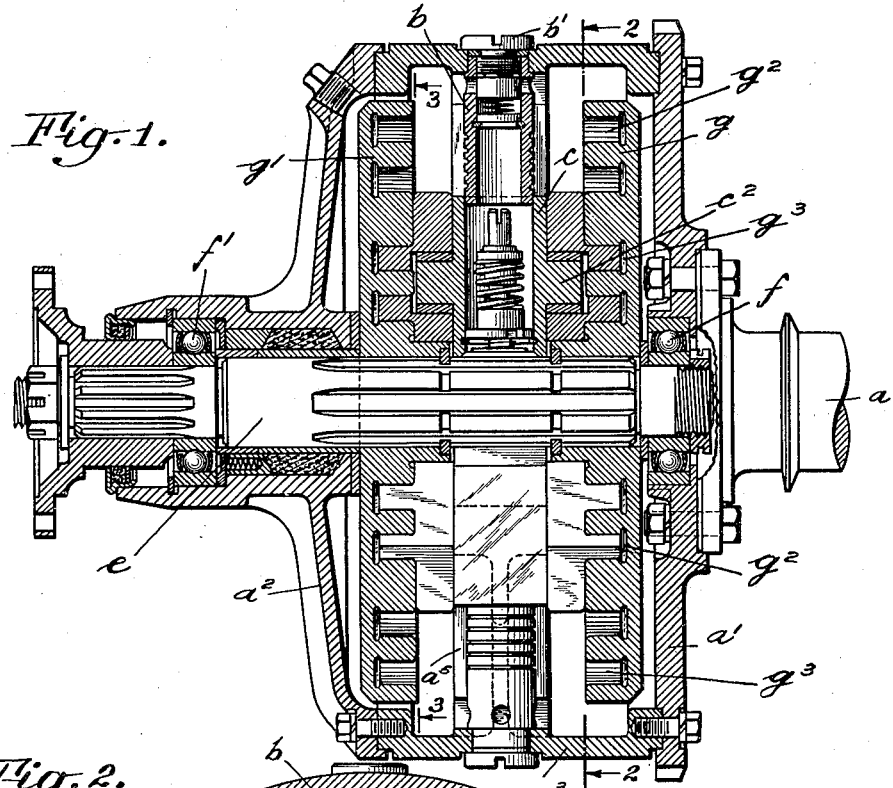
Figure 1 is a view in longitudinal section through the improved converter and showing the relation of the driving and driven shafts and the primary and secondary rotors carried therewith, respectively.
Figure 2:
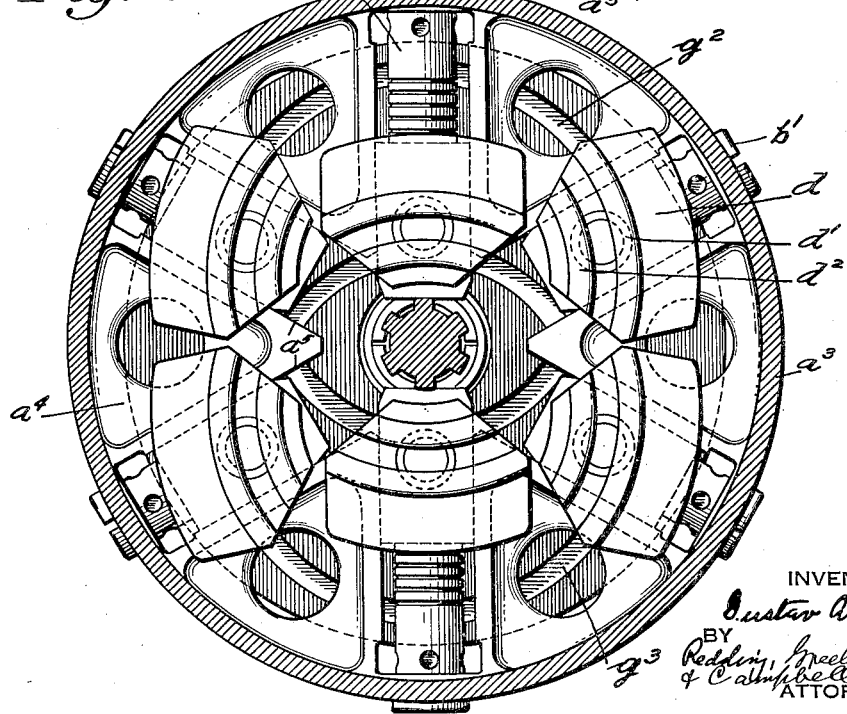
Figure 2 is a view in transverse section through the converter housing and taken on the plane indicated by the line 2—2 of Figure 1 and looking in the direction of the arrows.
Figure 9:
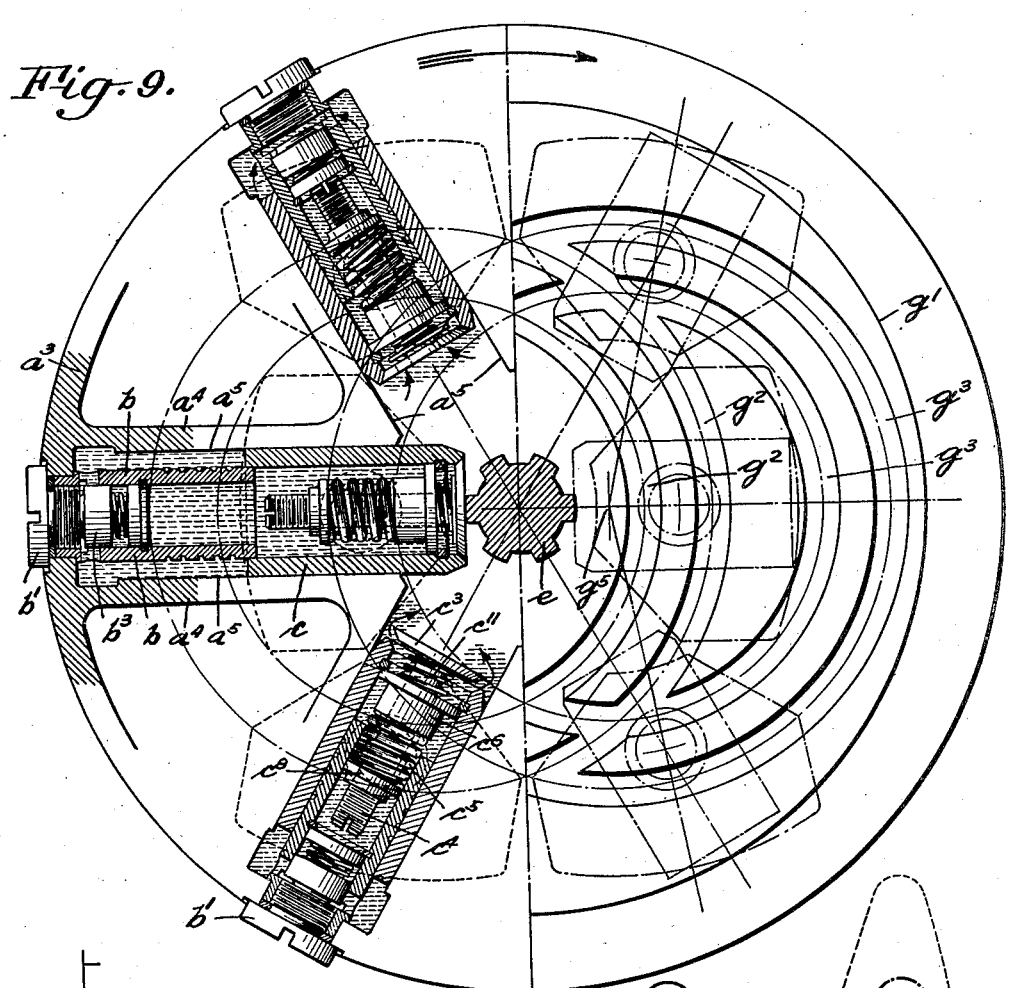
Figure 10:
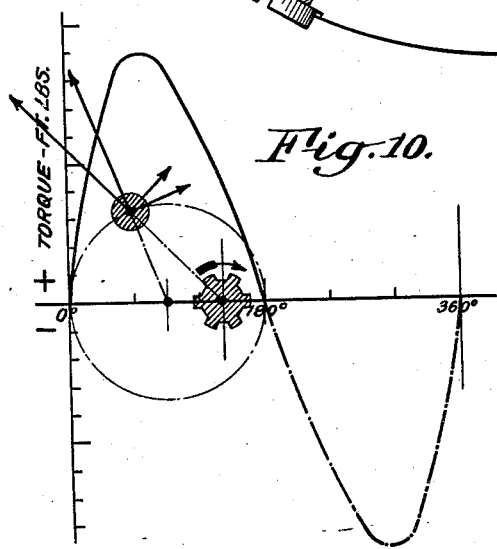
Figure 11:
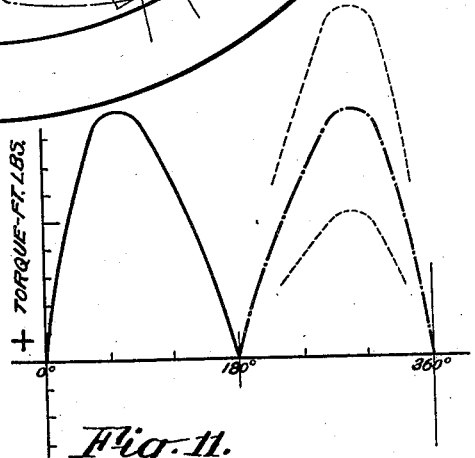

Figure 9 is a view in side elevation of the converter, parts of the end wall of the casing and other units being broken away to show somewhat diagrammatically the relationship of some of the parts.

Figures 10-13 are curves from which the characteristics of the device in operation will be made clear.

Figure 14 is a sectional view similar generally to Figure 4, but showing a modified construction of the controlling valves.

Figure 15 is a fragmentary view in section showing a detail of the controlling valve of the "piston" illustrated in Figure 14.

Figure 16 is a fragmentary view in horizontal section through the valve for the cylinder shown in Figure 14 and taken on the plane indicated by the line 0—0 looking in the direction of the arrows.

Figures 17-20 are schematic views from which will be made clear the resolution of forces imposed on the impellers in the operation of the device.

While it will be clear as the description proceeds that the principle of the underlying invention may be embodied in various structural forms and the details of construction of the illustrated embodiment vary widely, the following description will be addressed with some particularity to the specific form and arrangement of parts selected for illustration in this application. For instance, it should be noted that in the illustrated embodiment the reactance is impressed on a hydraulic medium, such as oil, but the principle of the invention may be retained without the employment of hydraulic means since mechanical devices to perform the equivalent function may be substituted.

The physical structure will first be described after which the mode of operation and the principle on which the invention rests will be made clear with particular reference to the diagrams and curves shown in the drawings. Referring first to Figs. 1-9, a prime mover shaft is indicated at $a$ and shown as connected to a casing comprising end walls $a'$, $a^2$ to which is secured a circular wall $a^3$. The circular wall $a^3$ carries on its inner side a plurality of radially extending guides which are shown as formed by segmental webs $a^4$ spaced in intervals circumferentially and having flat radially extending faces $a^5$ constituting the before mentioned guides. Between the proximate guide faces thus formed in pairs circumferentially of the wall $a^3$ there are disposed respectively inwardly extending tubes $b$ which are secured in place by screws $b'$. The inner ends of these tubes are open and they will be termed "pistons" hereinafter because of their function which will be later described. Slidably mounted between each of the pairs of proximate guides $a^5$ are disposed blocks $c$, the cross sectional form of which is made clear in Fig. 7. Each block has an interior circular bore $c'$ constituting a cylinder of such form and dimensions as to receive snugly the adjacent piston $b$. By the relationship described it will be evident that each block $c$ is constrained by its guide $a^5$ to move radially of the casing and that in such movement the block and its cooperating tube $b$ will bear the relationship of cylinder and piston, respectively. On the exterior side walls of each block in diametrical relationship are formed trunnions $c^2$ which extend generally parallel with the axis of the casing. On the trunnions are mounted pivotally guide blocks $d$ of similar form and having on their outer surfaces one or more arcuate flanges $d'$, $d^2$, the radius of curvature of which is predetermined in a manner which will later appear.

Extending into the casing in co-axial relationship with the prime mover shaft $a$ is a driven shaft $e$. Bearings $f$, $f'$, may be interposed operatively between the casing and the shaft $e$ so that the casing may rotate freely with respect to the shaft. Splined on the shaft $e$ within the casing are two spaced discs $g$, $g'$, which are similar and constitute the secondary rotor. On the proximate faces of the discs $g$, $g'$ are formed grooves which constitute tracks. Within these tracks fit snugly, respectively, the flanges $d'$, $d^2$ of the several guide blocks $d$. For strength and stability it is preferred to provide each of the guide blocks with two spaced guide flanges $d$, $d^2$ and accordingly, the tracks formed on the secondary rotor discs will be duplicated to receive such flanges, the duplicate tracks, however, being concentric for particular guide blocks. Referring to Fig. 3 particularly, it will be evident that two sets of tracks are formed on the faces of the secondary rotor discs, one set of tracks is indicated at $g^2$, $g^2$ and the other set of tracks is indicated at $g^3$, $g^3$. Each set of tracks is circular, but the center about which the track is struck off is eccentric with respect to the axis of the rotor disc. As shown in Fig. 3, for instance, the center of the tracks $g^2$ is indicated at $g^4$ and the center of the tracks $g^3$ is indicated at $g^5$. Further, it will be clear that these centers $g^4$, $g^5$ are diametrically opposed with respect to the axis of the secondary rotor discs, that is to say, diametrically opposed equi-distant from the axis of rotation of the casing. It will also be evident that by the construction described the two sets of tracks $g^2$, $g^3$ will intersect without, however, interrupting the continuity of each, so that the flanges $d'$, $d^2$ of the various guide blocks $d$ are free to move continuously in their respective track-ways without interruption.

From the description thus far given it will appear clearly that each block $c$ is constrained to move radially of the casing by reason of its confinement between the guides $a^5$ and is also constrained to move in an orbit defined by the tracks $g^3$ engaged by its particular guide blocks $d$. That is to say, assuming for the moment that the secondary rotor discs $g$, $g'$ are held stationary, rotation of the primary rotor constituted by the wall of the casing itself will bring about a planetary movement of each block $c$ about the axis of rotation of the casing and by reason of the eccentricity of the tracks $g^3$ with respect to such axis of rotation, the block will meantime be caused to reciprocate along the radial path defined by its guides $a^5$. Upon one complete revolution of the casing the block $c$ will make one complete reciprocation. In the illustrated embodiment six such blocks are shown, three of which, of course, are engaged operatively with the duplicate tracks $g^2$ and three of which are engaged operatively with the other duplicate tracks $g^3$. All of the blocks and cooperating parts are similar, so a description of one suffices. However, it is evident that any desired number of blocks may be employed, the general action of the machine being affected as will appear later in somewhat the same way as the action of an internal combustion engine is affected by the number of pistons. However, one important characteristic of the improved device resides in the fact that it is in static and dynamic balance. Accordingly, the blocks $c$ are arranged in pairs at diametrically opposite sides of the axis of the casing and are engaged respectively with different tracks $g^2$, $g^3$, so that the radial distance of each block and its associated parts from the axis of the casing is at all times equal to the radial distance of the opposite block therefrom, as appears clearly in Figs. 2 and 3.

With the blocks free to move, as described, under the influence of the primary rotor, which is the casing, it will be evident that the component of force impressed on the secondary rotor discs $g$, $g'$, tending to rotate such discs, is opposed by an equal and opposite force impressed on such rotor discs by the diametrically opposed block of each pair. Accordingly, provision must be made to subject such secondary rotor discs continuously to a component of force which will be effective to rotate it in the desired direction, which naturally will be the same direction as that in which the primary rotor is rotated. Stated in another way, provision must be made for neutralizing wholly or in part the counter force tending to oppose rotation of such secondary rotor. In the illustrated embodiment this is accomplished by the co-action of the cylinder $c'$ of each block $c$ and its cooperating piston $b$ with a liquid, such as oil, as the interposed medium to transmit the necessary reactance. To this end the entire casing is filled with oil which provides a lubricant for the moving parts and insures quiet and smooth operation of the device. As shown in Fig. 4, in detail, the tube $b$ is provided with openings $b^2$ adjacent its inner end through which oil may pass from the casing. These openings are controlled by a sleeve valve $b^3$ normally pressed to its seat by a spring $b^4$ which itself may be supported on a ring $b^5$ carried within the bore of the tube. In the lower end of the cylinder $c'$ of each block $c$ there is mounted a poppet valve $c^3$, the stem $c^4$ of which is engaged operatively by a valve spring $c^5$ which holds the valve $c^3$ on its seat normally. The valve spring $c^5$ may be seated on a guide $c^6$ through which the stem of the valve extends, the guide itself being carried on a ring $c^7$ supported within the bore of the cylinder. A nut $c^8$ threaded on the valve stem permits the tension of the spring $c^5$ to be regulated for a purpose which will appear later. A secondary disc valve $c^9$ controls a series of openings $c^{10}$ in the valve $c^3$ and is normally urged to its seat by a valve spring $c^{11}$ which itself is also seated on the guide $c^6$.

In operation, when a block $c$ is in the relation to its piston $b$, shown in Fig. 4, the interior of the piston and cylinder will be filled with oil. When the block $c$ is moved outwardly radially in the manner hereinbefore described the oil will be expelled to the interior of the casing past the valve $c^3$ which will be unseated by the pressure of the oil thereon from the interior of the cylinder but against the action of the spring $c^5$. The resistance thus offered by the oil to the outward movement of the block $c$ is predetermined by the tension of the spring $c^5$. Contrariwise, when a block $c$ is moved inwardly in the manner hereinbefore described oil will be forced into the interior of the piston $b$ by the unseating of the valve $b^3$. This pressure arises both from the centrifugal force to which the oil within the casing is subjected during the rotation of the casing and from the reduction of pressure within the cylinder $c'$ and piston $b$ by the inward travel of the block $c$. At the same time, oil will be admitted into the cylinder $c'$ directly by the unseating of the disc valve $c^9$ during the inward travel of the block, as indicated at the upper left hand sectional view in Fig. 9.

In the modified valve construction shown in Figs. 14–16 the inner end of the piston $b$ is provided with a flat disc valve $B^3$ which is normally urged to its seat by a cooperating spring $B^4$. During inward travel of the block $c$ the oil pressure unseats the valve $B^3$ and admits oil into the interior of the piston, as indicated in Fig. 15. The cylinder at its inner end is in constant communication with the interior of the casing through openings $c^{12}$ formed in a valve block $c^{13}$, the effective area of the openings being controllable by an adjustable needle valve $c^{14}$. Other openings $c^{15}$ in the valve block $c^{13}$ are controllable by a flat disc valve $c^{16}$, normally urged to its seat by a spring $c^{17}$, the valve $c^{16}$ being unseated by the pressure of the oil during inward movement of the block $c$, substantially in accordance with the action described in connection with the embodiment shown in Fig. 4.

Figure 17:
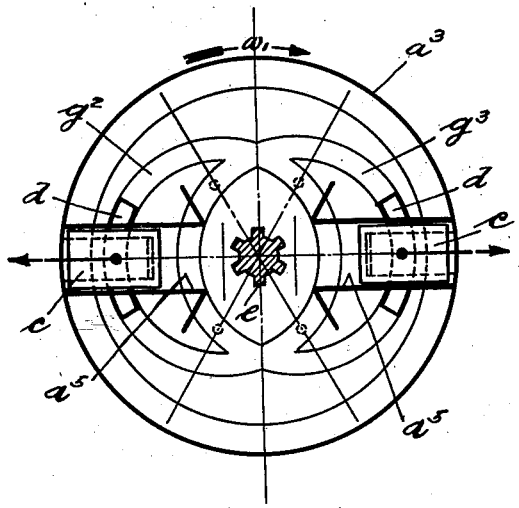
Figure 18:
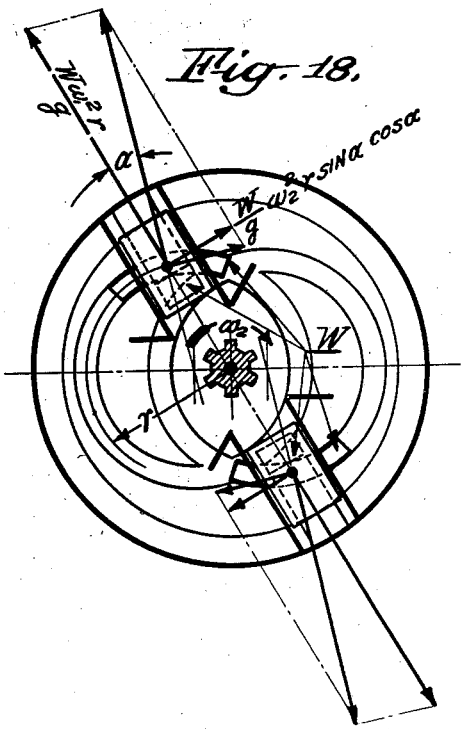
Figure 19:
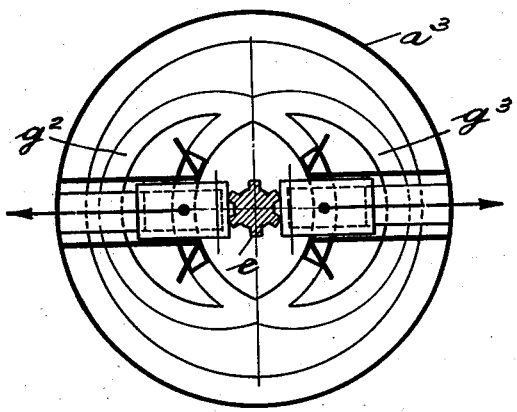
Figure 20:
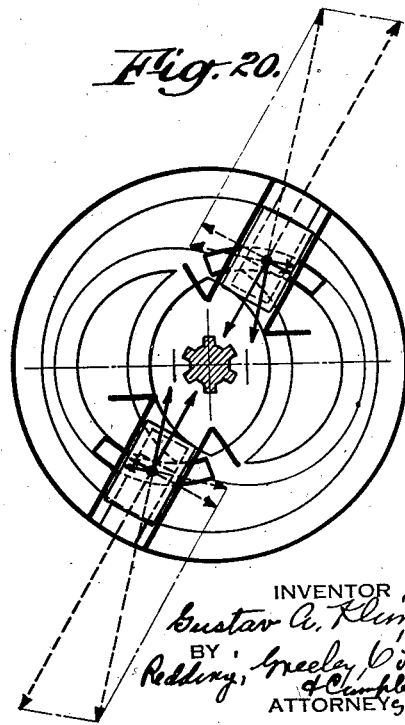

Thus far the description has been devoted to the physical structure without an attempt to describe the principle of operation. Reference is now to be had to the diagrams in Figs. 17–20 for that purpose. In these diagrams two tracks $g^2$, $g^3$ are indicated. The maximum eccentricity of the tracks with respect to the axis of the casing is indicated by the symbol $r$. Only two diametrically opposed blocks $c$ are indicated in order that the description may be simple, it being understood that the action of all of the other pairs of blocks is the same. The outer circle indicates the circular wall $a^3$ of the casing and may be termed the primary rotor. The parallel guides for the blocks are indicated at $a^5$ by which the blocks are constrained to move radially. In understanding the method by which torque from the prime mover is converted for impression on the secondary rotor, the moving block $c$ and associated parts, including particularly the guide blocks $d$, may be termed impellers. The guide blocks $d$ are constrained to follow the tracks in which they are disposed, respectively, upon rotation of the primary rotor and since these guide blocks are pivotally attached to their respective blocks $c$, the latter are constrained to move radially in accordance with the eccentricity of the tracks with respect to the axis of rotation of the casing. As shown in Fig. 17, the blocks $c$ are in their outermost positions of travel. At this time they are at the maximum distance from the axis of rotation of the casing. Accordingly, when in motion they are subjected to maximum centrifugal force. Assuming clockwise rotation of the primary rotor and considering only the block $c$ at the left of the drawing the block $c$ under the influence of its guide block $d$ will be caused to travel inwardly until it reaches the position closest to the axis of rotation 180° from its starting point, as shown in Fig. 19. During the travel through this path of 180°, the component of force tending to rotate the secondary rotor is impressed thereon by the curved block $d$ in contact with the side wall of its track. The torque impressed on the secondary rotors during the travel of the impeller is equal to $$\frac{W}{g} w_2^2 r \sin \alpha \cos \alpha$$

in which formula $W$ is the weight of the impeller, $g$ the gravitational constant, $w_2$ is the angular speed of the secondary rotor and $r$ is the distance from the axis of the casing. In the formula the angle $\alpha$ is the angle between intersecting radii drawn from the trunnion $c^2$ of the block $c$ to the axis of the casing and to the center of the track, respectively. In the formula the angle will constantly vary, as will $r$. The block itself will constantly decelerate from its extreme outward position to its innermost position. The torque impressed on the secondary rotor will vary at different angles during the travel of the block dropping to zero when it has reached its innermost position, the curve being indicated in Fig. 12. From this curve and referring to the diagrammatic illustration in Fig. 10 it will be seen that the maximum torque is developed when the block is about 75° past its outermost position. Consideration is now to be given to the effect on the secondary rotor when the block $c$ passes from its innermost position, as shown in Fig. 19, to its outermost position, as shown in Fig. 17. The block is constantly accelerated during this travel. The centrifugal course impressed on it includes one component which acts on the outer wall of the track through the guide block $d$ tending to oppose rotation of the secondary rotor in a clockwise direction. This force is equal and opposite to the force impressed on the diametrically opposed block and tending to rotate the secondary rotor in a clockwise direction. It is this retarding force which must be reduced or eliminated in order that the desired torque ratio as between the primary rotor and the secondary rotor may be established. In order to establish a reactance which will reduce or neutralize this component various means may be employed. In the illustrated embodiment the outward movement of the block now under consideration is opposed by the oil confined within the cylinder $c'$ and piston $b$. This oil and its consequent resistance to such outward movement is released under predetermined pressure by adjustment of the spring $c^5$ which tends to seat the valve $c^3$. By proper adjustment of the spring $c^5$ the reactance from the oil may neutralize the component of force opposing rotation of the secondary rotor in a clockwise direction, the result being as to each impeller the positive driving of the secondary rotor in a clockwise direction in accordance with the curves shown in Fig. 12. Unrestrained movement of the block $c$ from its inner to its outer position will create opposing forces indicated by the dot and dash line curve in Fig. 10 and it is this force which is removed. Referring now to the curves shown in Fig. 13 the resulting operation of the device can be visualized. By following the variables in the formula set forth above it will be apparent that the curves can be predetermined to meet the requirements of use to which the torque converter is to be put in a particular situation as, for instance, in a motor vehicle. In the assumed position the maximum efficiency is to be obtained at a speed of 800 R. P. M. of the primary rotor at which time the secondary rotor may be brought up to an equal speed and the driving and driven elements rotate in unison with a 1–1 torque ratio. Conversely, the maximum torque ratio as is desirable is attained at the instant rotation of the secondary rotor is accomplished. On the curves shown in Fig. 13 this torque ratio is about 3 to 1 at the instant rotation of the secondary rotor commences. At this instant, the efficiency is a minimum and the lag a maximum. As the secondary rotor comes up to speed the torque ratio drops, the lag drops and the efficiency rises until the speed of the secondary rotor equals the speed of the primary rotor. When this occurs efficiency is 100% and the lag is zero. However, the oil medium interposed between the driving and the driven elements is subject to displacement instantly under unusual stresses or shocks, thereby maintaining a connection which is yielding in character in order to relieve the parts of such shocks and stresses. The provision of oil within the casing is, of course, a highly desirable condition for the moving parts and assures quietness. The relatively movable parts may be nicely fitted so that there is an absence of lost motion. The radial and angular travel of the impellers is under constant constraint assuring quietness. Manual control is made unnecessary since the desired curves follow from the particular design as predetermined. Idling of the primary rotor at relatively low speeds is permitted and the need for a clutch is eliminated since the secondary rotor is propelled under predetermined conditions of operation of the primary rotor. In the design illustrated, the tension on the valve spring $c^5$ may be kept within such limits that the secondary rotor may freely overrun the primary rotor, so as to afford the equivalent of a free-wheeling action. On the other hand, if desired, the tension of the spring $c^5$ may be increased to a point where the resistance to the outer movement of the block is raised so that such a free-wheeling action is eliminated and a braking action of the prime mover impressed on the secondary under such circumstances. Such a condition will further enable the primary rotor to impress on the secondary rotor a positive driving force during the period when the block $c$ is moving from its innermost position to its outermost position as considered in connection with Figs. 19 and 20. The entire control is smooth under all conditions of operation.

As indicated before, other means than hydraulic may be employed to bring about the necessary resistance to the outward movement of the impeller, such as springs, friction devices or the like, and the invention in its broadest aspect is not to be limited to the use of oil. Similarly, changes in the form, dimensions and relationship of parts may be made by one skilled in the art without avoiding the scope and spirit of the appended claims.

I claim as my invention:

1. A torque converter comprising in combination a driving rotor, a driven rotor, impellers having operating cycles and operatively interposed between said rotors, and reactance means operatively engaged with said impellers, and operative for a part only of the operating cycle of the impellers to reduce the forces which oppose the rotation of the driven rotor in a predetermined direction.

2. A torque converter comprising in combination a driving rotor, a driven rotor, movable impellers engaged operatively with said rotors, means carried by said rotors engaging said impellers to constrain them to move in predetermined paths, and reactance means operatively engaged with said impellers at predetermined times only during their movements to reduce the forces which are impressed on said impellers during said predetermined times and which oppose the rotation of the driven rotor in a predetermined direction.

3. A torque converter comprising in combination a driving rotor, a driven rotor, similar movable impellers disposed in pairs at diametrically opposite sides of the axis of said rotors, circular tracks carried by the driven rotor and disposed eccentrically with respect to one another and with respect to the axis of said driven rotor, and means engaging the impellers of each pair with the respective tracks, whereby the impellers are constrained to move, and means carried by the driving rotor and engaging said impellers respectively to cause said impellers to move radially upon rotation of the driving rotor and during the planetary movement of said impellers under the constraint of said tracks.

4. A torque converter comprising in combination a driving rotor, a driven rotor, similar movable impellers disposed in pairs at diametrically opposite sides of the axis of said rotors, circular tracks carried by the driven rotor and disposed eccentrically with respect to one another and with respect to the axis of said driven rotor, and means engaging the impellers of each pair with the respective tracks, whereby the impellers are constrained to move, and means carried by the driving rotor and engaging said impellers respectively to cause said impellers to move radially upon rotation of the driving rotor and during the planetary movement of said impellers under the constraint of said tracks, said tracks being formed about centers which are diametrically opposed at equal distances from the axis of said driven rotor.

5. A torque converter comprising in combination a driving rotor, a driven rotor, similar movable impellers disposed in pairs at diametrically opposite sides of the axis of said rotors, circular tracks carried by the driven rotor and disposed eccentrically with respect to one another and with respect to the axis of said driven rotor, means engaging the impellers of each pair with the respective tracks, whereby the impellers are constrained to move, means carried by the driving rotor and engaging said impellers respectively to cause said impellers to move radially upon rotation of the driving rotor and during the planetary movement of said impellers under the constraint of said tracks, said tracks being formed about centers which are diametrically opposed at equal distances from the axis of said driven rotor, and means operatively engaged with said impellers to oppose their radial movements towards the axis of the driven rotor and thereby reduce the force tending to oppose rotation of the said driven rotor in a predetermined direction.

6. A torque converter comprising in combination a driving rotor, a driven rotor, similar movable impellers disposed in pairs at diametrically opposite sides of the axis of said rotors, circular tracks carried by the driven rotor and disposed eccentrically with respect to one another and with respect to the axis of said driven rotor, means engaging the impellers of each pair with the respective tracks, whereby the impellers are constrained to move, means carried by the driving rotor and engaging said impellers respectively to cause said impellers to move radially upon rotation of the driving rotor and during the planetary movement of said impellers under the constraint of said tracks, said tracks being formed about centers which are diametrically opposed at equal distances from the axis of said driven rotor, and hydraulic means operatively engaged with said impellers to oppose their radial movements towards the axis of the driven rotor and thereby reduce the force tending to oppose rotation of the said driven rotor in a predetermined direction.

7. A torque converter comprising in combination a driving rotor, a driven rotor, similar movable impellers disposed in pairs at diametrically opposite sides of the axis of said rotors, circular tracks carried by the driven rotor and disposed eccentrically with respect to one another and with respect to the axis of said driven rotor, means engaging the impellers of each pair with the respective tracks, whereby the impellers are constrained to move, means carried by the driving rotor and engaging said impellers respectively to cause said impellers to move radially upon rotation of the driving rotor and during the planetary movement of said impellers under the constraint of said tracks, said tracks being formed about centers which are diametrically opposed at equal distances from the axis of said driven rotor, radially extending cylinders formed in said impellers, cooperating radially extending pistons carried by the driving rotor and cooperating with said cylinders, respectively, and valves operatively related to the said cylinders and pistons to control the inflow and outflow of oil during radial movements of the impellers whereby the outward movements of said impellers are opposed to a predetermined extent to reduce forces impressed thereon and on the driven rotor tending to oppose its rotation in a predetermined direction.

8. A torque converter comprising in combination an enclosed circular casing constituting a driving rotor, radially extending guides within the casing and carried thereby, impellers mounted slidably in said radial guides respectively and having radially extending cylinders formed therein, radially extending pistons mounted on the circular wall of the casing and adapted to enter said cylinders, respectively, upon outward travel of the impellers, a driven rotor mounted within the casing coaxially therewith and having circular tracks on its face engaged operatively with said impellers, and oil within the casing adapted to enter said cylinders upon inward travel of the impellers and to be expelled from said cylinders under predetermined pressure upon outward travel of the impellers.

9. A torque converter comprising in combination a circular casing having radial guides supported therein, impellers mounted slidably within the guides and in pairs at diametrically opposite sides of the axis of the casing, a secondary rotor mounted within the casing and coaxially therewith and having on its face two circular tracks symmetrically located with respect to the axis of the rotor but eccentric with respect thereto and to each other, the centers of said circular tracks lying equi-distant on diametrically opposite sides of the axis of the rotor, means engaging the impellers of each diametrically opposed pair with the two tracks, respectively, and means to oppose to a predetermined extent outward travel of the respective impellers in their guides to reduce the forces tending to oppose rotation of the secondary rotor in a predetermined direction.

GUSTAV A. KLIMEK.